United States Patent [19]

Wilber

[11] Patent Number: 4,694,226
[45] Date of Patent: Sep. 15, 1987

[54] VERTICAL DEFLECTION CIRCUIT WITH SERVICE MODE OPERATION

[75] Inventor: James A. Wilber, Indianapolis, Ind.

[73] Assignee: RCA Corporation, Princeton, N.J.

[21] Appl. No.: 901,614

[22] Filed: Aug. 29, 1986

[51] Int. Cl.$^4$ .................... H01J 29/70; H04N 17/02
[52] U.S. Cl. .................................... 315/408; 358/10; 315/397; 315/389
[58] Field of Search ............... 315/408, 399, 397, 396, 315/389; 358/10, 139, 101

[56] References Cited

U.S. PATENT DOCUMENTS

| | | | |
|---|---|---|---|
| 3,461,225 | 8/1969 | Crookshanks et al. ............... | 358/10 |
| 3,525,801 | 8/1970 | Willis .................................. | 358/10 |
| 3,715,493 | 2/1973 | Allen .................................. | 358/10 |
| 3,820,155 | 6/1974 | Neal .................................... | 358/10 |
| 4,123,776 | 10/1978 | Cochran et al. ..................... | 358/10 |
| 4,130,829 | 12/1978 | Kam et al. ........................... | 358/10 |
| 4,272,777 | 6/1981 | Fitzgerald ............................ | 358/10 |
| 4,309,718 | 1/1982 | Johnson ............................... | 358/10 |

FOREIGN PATENT DOCUMENTS 2041265 5/1978 Fed. Rep. of Germany ........ 358/10

OTHER PUBLICATIONS

U.S. patent application Ser. No. 862,287, filed May 12, 1986, entitled Service Switch for Video Display Apparatus, H. Pan et al.
"The CTC 85 Color Chassis Technical Manual", dated 1977, pp. 35-44 and the Deflection and Power Supply Schematic Drawing.
"RCA CTC136 Color Television Basic Service Date", dated 1986, and published prior to the filing date of applicant Wilber's U.S. patent application.

Primary Examiner—Theodore M. Blum
Assistant Examiner—David Cain
Attorney, Agent, or Firm—Eugene M. Whitacre; Paul J. Rasmussen; Joseph J. Laks

[57] ABSTRACT

In a video display apparatus having a service mode of operation, a vertical deflection circuit includes a vertical deflection winding coupled to a DC blocking capacitor. An output stage includes first and second output amplifiers coupled to the vertical deflection winding in a push-pull arrangement at an output terminal. A vertical sawtooth voltage generator is coupled to a driver stage via an error amplifier that provides both AC and DC negative feedback for driving the output stage at a vertical rate in a sawtooth manner to generate a sawtooth deflection current in the deflection winding and for establishing a DC operating voltage level at the output terminal that charges the DC blocking capacitor. A service mode switching circuit is coupled to the driver stage for asserting the service mode of operation by maintaining the first output amplifier in cutoff and the second output amplifier in conduction to discharge the DC blocking capacitor and disable the generation of the sawtooth deflection current.

11 Claims, 1 Drawing Figure

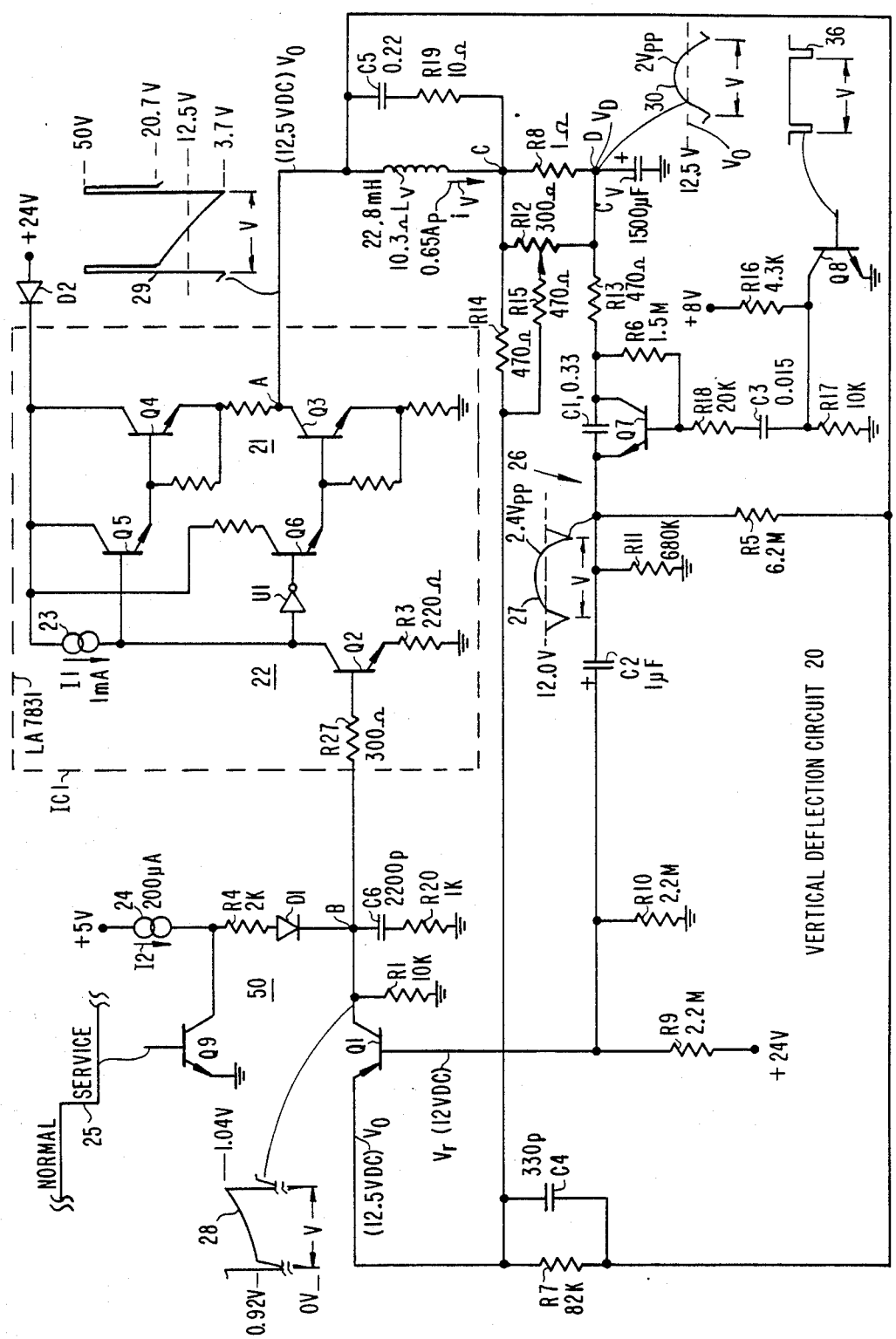

VERTICAL DEFLECTION CIRCUIT WITH SERVICE MODE OPERATION

This invention relates to a vertical deflection circuit with service mode operation.

To manually adjust the color temperature in a television receiver or a video display apparatus, various circuits in the television receiver are disabled including the vertical deflection circuit. The vertical deflection circuit is disabled in order to collapse the raster into a single horizontal line. A service switch may be used to ground or otherwise apply a disabling potential at a point in the vertical deflection circuit that prevents the generation of vertical deflection current. When the vertical deflection circuit includes a push-pull output stage, the vertical deflection circuit may be disabled in such a manner as to disable the AC vertical sawtooth generator or to bias the push-pull output stage into developing only a DC voltage at its output terminal. The DC blocking capacitor coupled to the vertical deflection winding will remain charged during service mode of operation. The voltage level to which the DC blocking capacitor is charged during service mode operation may undesirably be greater than the normal DC operating voltage level.

In accordance with a feature of the invention, a service mode circuit arrangement is provided that discharges the DC blocking capacitor during service mode of operation. A vertical deflection circuit includes a vertical deflection winding and a DC blocking capacitance coupled to the deflection winding. An output stage includes first and second output amplifiers coupled to the vertical deflection winding at an output terminal in a push-pull arrangement. The first and second output amplifiers are respectively coupled to a source of supply voltage and to a reference potential point. A vertical sawtooth voltage generator is coupled to a driver stage for driving the output stage at a vertical rate in a sawtooth manner to generate a sawtooth vertical deflection current and establish a DC operating voltage level at the output terminal that charges the DC blocking capacitance. Service mode circuitry is coupled to the driver stage for asserting the service mode of operation by maintaining the first output amplifier in cutoff and the second output amplifier in conduction to discharge the DC blocking capacitance and disable the generation of the sawtooth deflection current.

The FIGURE illustrates a vertical deflection circuit with service mode operation, embodying the invention.

In the illustrated vertical deflection circuit 20 for a television receiver or a video display apparatus, a vertical deflection winding $L_V$ is coupled to a vertical amplifier output stage 21 at an output terminal A. A current sampling resistor R8 is coupled to deflection winding $L_V$ at a terminal C, and a DC blocking and S-shaping capacitor $C_V$ is coupled to resistor R8 at a terminal D.

Vertical output stage 21 includes a top amplifier transistor Q4 coupled to a +24 V DC supply via a diode D2 and a bottom amplifier transistor Q3 coupled to a ground reference potential point. A driver stage 22 is coupled to output stage 21 for driving the output stage at a vertical rate in a sawtooth manner to generate a sawtooth vertical deflection current $i_V$ in vertical deflection winding $L_V$.

Driver stage 22 includes an inverting amplifier, driver transistor Q2, and a current source 23 coupled to the collector of the transistor. Driver transistor Q2 drives top output transistor Q4 via a noninverting buffer transistor Q5 and drives bottom output transistor Q3 via an inverting stage U1 and a noninverting buffer transistor Q6. The driver and output stages may be incorporated into an integrated circuit, IC 1, such as the LA7831, manufactured by Sanyo Corporation.

To generate a vertical sawtooth current $i_V$ in vertical deflection winding $L_V$, a vertical ramp generator 26 generates a downwardly going vertical ramp voltage 27 that is AC coupled by a capacitor C2 to the base of an error amplifier transistor Q1. Error amplifier transistor Q1 inverts vertical ramp voltage 27 to develop a vertical input voltage 28 across a collector load resistor R1 of transistor Q1. Input voltage 28 is applied to an input terminal B of driver stage 22 that is coupled to the base of inverting amplifier transistor Q2 via a resistor R2.

Vertical input voltage 28 progressively increases the conduction of driver transistor 22 during the vertical trace interval, progressively shunting more of current I1, developed by current source 23, away from top output amplifier portion Q5 and Q4. During the first half of trace, output transistor Q4 is conducting, to couple the +24 V supply to vertical deflection winding $L_V$ via diode D2. A decreasing vertical deflection current $i_V$ flows in deflection winding $L_V$ and charges DC blocking capacitor $C_V$ from the +24 V supply via transistor Q4.

During the second half of vertical trace, driver transistor Q2 has been made sufficiently conductive by input voltage 28 to turn off top output transistor Q4 and turn on bottom output transistor Q3. DC blocking capacitor $C_V$ discharges to ground via vertical deflection winding $L_V$ and transistor Q3, thereby generating the negative sawtooth portion of vertical deflection current $i_V$.

To initiate the vertical retrace interval, input voltage 28 turns off driver transistor Q2, thereby turning off bottom output transistor Q3 and turning on top output transistor Q4. Conventional vertical retrace circuitry, not illustrated in the FIGURE, provides for the retrace of vertical deflection current $i_V$.

The operation of output stage 21 in response to vertical input voltage 28, develops a vertical output voltage 29 at output terminal A that is applied to vertical deflection winding $L_V$. The DC level, $V_0$, established at output terminal A, also establishes the same DC level at terminals C and D. Vertical deflection current $i_V$ generates an AC sawtooth voltage between terminals C and D, across sampling resistor R8, and generates a parabolic component 30 to the voltage $V_D$ developed across DC blocking capacitor $C_V$.

A DC negative feedback loop from output terminal A to input terminal B stabilizes the DC operating voltage level at terminal A. The voltage at terminal A is coupled via terminal C to the emitter of error amplifier transistor Q1 to establish the DC voltage of the emitter at voltage level $V_0$. Voltage level $V_0$ is compared with a reference voltage level $V_r$ that is developed at the base of transistor Q1 by voltage dividing resistors R9 and R10. The level of input voltage 28 is controlled by the conduction of transistor Q1 for stabilizing the DC voltage level $V_0$ at an operating level that is approximately $1V_{be}$ above reference voltage level $V_r$.

AC negative feedback for scan linearization is provided by coupling the AC sawtooth voltage developed across sampling resistor R8 to the emitter of error transistor Q1 via a voltage dividing network comprising potentiometer R12 and resistors R14 and R15. The AC sawtooth voltage at the emitter of error transistor Q1 is compared against reference ramp voltage 27 that is AC coupled to the base of the transistor in order to develop the AC component of input voltage 28. Deflection current amplitude is adjusted by adjusting the wiper arm of potentiometer R12.

Ramp generator 26, that develops AC reference ramp voltage 27, comprises an RC integrating network, capacitor C1 and resistor R11, and a reset switch, transistor Q7, coupled across capacitor C1. Voltage $V_D$ developed across DC blocking capacitor $C_V$ is applied to the integrating network of capacitor C1 and resistor R11 via a resistor R13. The DC component of voltage $V_D$ is integrated by capacitor C1 to generate a downwardly-going ramp of voltage across resistor R11. The AC, parabolic component of voltage $V_D$ is integrated by capacitor C1 to provide S-shaping of the ramp voltage across resistor R11.

To initiate vertical retrace, ramp capacitor C1 is discharged by making reset transistor Q7 conductive. A vertical reset pulse 36, generated by vertical synchronization circuitry not illustrated in the FIGURE, is applied to the base of a transistor Q8, making the transistor nonconductive during the short reset pulse interval. The collector of transistor Q8 is coupled to a +8 V supply by a resistor R16 and is coupled to ground by a resistor R17. The junction of the two resistors and the collector of transistor Q8 is AC coupled to the base of reset transistor Q7 via a capacitor C3 and a resistor R18. Negative going reset pulse 36 is inverted by transistor Q8 and applied to the base of transistor Q7, to turn transistor Q7 on and discharge capacitor C1. The sharp increase in ramp voltage 27 when capacitor C1 is discharged is coupled to the base of error amplifier transistor Q1 and turns the transistor off to initiate the vertical retrace interval.

A resistor R6 coupled between the collector and base of reset transistor Q7 discharges capacitor C3 to remove charge accumulated on the capacitor during the cutoff interval of transistor Q8. A resistor R5 is coupled between output terminal A and the junction of capacitor C1 and resistor R11 to introduce a compensating current that compensates for the slight exponential waveshape to the ramp current developed in resistor R11. A capacitor C5 in series with a resistor R19 across deflection winding $L_V$ damps deflection winding resonances. Resistor R13 provides current limiting under transient picture tube arcing conditions should the ground reference potential point for voltage $V_D$ differ greatly from other ground reference potential points, such as for the base or emitter of error amplifier transistor Q1. A parallel network of a resistor R7 and a capacitor C4 is coupled between output terminal A and the emitter of error amplifier transistor Q1 to compensate for horizontal rate pickup by vertical deflection winding $L_V$. A capacitor C6 in series with a resistor R20 is coupled between input terminal B and ground to roll off the gain at higher frequencies to prevent deflection circuit high frequency oscillation.

During service mode operation of the television receiver, when, for example, color temperature is to be manually adjusted, it may be desirable to provide for vertical collapse of the raster by disabling vertical deflection circuit 20. In accordance with a feature of the invention, a service mode switching circuit 50 disables the generation of vertical deflection current when the service mode of operation is asserted. Service mode switching circuit 50 includes a current source 24 coupled to a +5 V supply, a service mode switching transistor Q9 having its collector coupled to current source 24 and its emitter coupled to ground, and a diode D1, having its cathode coupled to vertical input terminal B and its anode coupled to the junction of current source 24 and the collector of transistor Q9 via a resistor R4.

During the normal mode of television receiver operation, a mode-switching signal 25, that may be conventionally generated, is in the high state, maintaining transistor Q9 in saturated conduction. Current I2 of current source 24 is shunted to ground. The near-ground potential at the collector of transistor Q9 provides reverse biasing of diode D1, thereby disconnecting service mode switching circuit 50 from vertical input terminal B.

To assert the service mode of television receiver operation, mode-switching signal 25 is switched to the low state to cutoff conduction in transistor Q9. With transistor Q9 cutoff, the collector voltage increases sufficiently to forward bias diode D1 and provide a path for current I2 to flow to input terminal B. Current I2 flows in resistor R1 and to the base of driver transistor Q2 to bias the transistor into continuous, saturated conduction.

The continuous, saturated conduction of driver transistor Q2 shunts current I1 from the top portion of output stage 21, thereby cutting off conduction in output transistor Q4. At the same time, the saturated conduction of driver transistor Q2 turns on bottom output transistor Q3 and maintains the transistor in continuous, saturated conduction.

With transistor Q3 in continuous, saturated conduction during service mode of operation, DC blocking capacitor $C_V$ is discharged to ground via the transistor. With transistor Q2 in cutoff, the +24 V supply is disconnected from terminal A and from vertical deflection winding $L_V$, preventing the recharging of capacitor $C_V$. By making transistor Q3 conductive and transistor Q4 cutoff during service mode operation, instead of making transistor Q4 conductive and transistor Q3 cutoff, capacitor $C_V$ is discharged to zero volts instead of being charged to the +24 V supply level. This arrangement advantageously avoids stressing capacitor $C_V$ during service mode operation by a voltage in excess of the normal DC operating voltage level $V_0$.

To reliably maintain the television receiver in the service mode of operation, the amplitude of biasing current I2, provided by service mode switching circuit 50, is sufficiently large to develop a base biasing voltage across resistor R1 that maintains driver transistor Q2 in saturated conduction. By coupling current I2 to the output of error amplifier transistor Q1, the DC negative feedback loop is bypassed. Thus, when the DC negative feedback loop attempts to raise the DC voltage level at terminal A, in an attempt to maintain a stabilized operating voltage level $V_0$ during service mode operation, error amplifier transistor Q1 becomes cutoff. With error amplifier transistor Q1 cutoff, the DC negative feedback loop becomes disconnected from input terminal B and will not attempt to adversely counteract the operation of service mode switching circuit 50.

The switching arrangement of transistor Q9 and diode D1 is advantageously designed to raise the voltage level at vertical input terminal B so as to bias driver transistor Q2 into continuous, saturated conduction. By this means, vertical deflection circuit 20 is disabled during service mode operation. This type of switching arrangement has several advantages over other types of switching arrangements which, for example, attempt to ground vertical input terminal B through a diode in order to shunt base current away from driver transistor Q2 and bring the transistor into cutoff.

Because the emitter of driver transistor Q2 is grounded via emitter resistor R3, a relatively small bias or offset voltage at the base will bring transistor Q2 out of cutoff. Approximately 0.7 V is needed to offset the forward base-emitter junction voltage of transistor Q2, and approximately 0.2 V of additional offset voltage is needed to take into account the voltage drop across resistor R3 produced by collector-to-emitter current flow in transistor Q2. Thus, for the values illustrated in the FIGURE, the voltage at the base required to bring transistor Q2 out of cutoff is near 0.9 V. A service switching arrangement, that attempts to disable vertical deflection circuit 20 by shunting base current to ground via a diode coupled in parallel with the base-emitter junction of transistor Q2, may, therefore, have difficulty in maintaining the voltage at terminal B below the cutoff biasing voltage level of the transistor.

What is claimed:

1. A vertical deflection circuit for a video display apparatus having a service mode of operation, comprising:
    a vertical deflection winding;
    a DC blocking capacitance coupled to said deflection winding;
    an output stage including first and second output amplifiers coupled to said vertical deflection winding in a push-pull arrangement at an output terminal, said first and second output amplifiers being respectively coupled to a source of supply voltage and to a reference potential point;
    a driver stage coupled to said output stage;
    a vertical sawtooth voltage generator coupled to said driver stage for applying a vertical sawtooth voltage thereto to drive said output stage at a vertical rate in a sawtooth manner to generate a sawtooth vertical deflection current in said deflection winding and establish a DC operating voltage level at said output terminal that charges said DC blocking capacitance; and
    service mode means coupled to said driver stage for asserting said service mode of operation by maintaining said first output amplifier in cutoff and said second output amplifier in conduction to discharge said DC blocking capacitance and disable the generation of said sawtooth deflection current.

2. A vertical deflection circuit according to claim 1 wherein said service mode means is coupled to said driver stage at a junction terminal formed by an input of said driver stage and an output of an error amplifier to which error amplifier said vertical sawtooth voltage is applied.

3. A vertical deflection circuit according to claim 2 wherein said service mode means includes a diode coupled to said junction terminal and made conductive when said service mode of operation is asserted.

4. A vertical deflection circuit according to claim 1 wherein said driver stage includes a signal amplifier for amplifying said vertical sawtooth voltage prior to its application to said output stage and wherein said service mode means includes means for biasing said signal amplifier into nonlinear operation when said service mode of operation is asserted.

5. A vertical deflection circuit according to claim 4 wherein said biasing means includes a source of bias current and means coupled to said current source for supplying said bias current to said signal amplifier to maintain said signal amplifier in saturation when said service mode of operation is asserted.

6. A vertical deflection circuit according to claim 5 wherein said bias current supplying means comprises a switch coupled to said current source and to said signal amplifier and means for maintaining said switch conductive only when said service mode of operation is asserted.

7. A vertical deflection circuit according to claim 2 wherein said error amplifier is coupled to the output terminal of said output stage to form a negative feedback loop that stabilizes said DC operating voltage level.

8. A vertical deflection circuit according to claim 7 wherein said service mode means includes a switch coupled to said junction terminal and to a source of bias current for supplying said bias current to said driver stage when said service mode of operation is asserted.

9. A deflection circuit with a service mode arrangement, comprising:
    a deflection winding;
    a deflection amplifier having an output terminal coupled to said deflection winding and being responsive to a deflection rate drive signal for generating a deflection rate deflection current in said deflection winding;
    an error amplifier having an input terminal coupled to said output terminal and having an output terminal at which there is developed an error voltage, said output terminal being coupled to an input terminal of said deflection amplifier to form a negative feedback loop for stabilizing a DC voltage level at the output terminal of said deflection amplifier; and
    service mode means coupled to the output terminal of said error amplifier for applying thereto during service mode operation a DC bias voltage that overrides said error voltage for disabling the generation of said deflection rate deflection current.

10. A deflection circuit according to claim 9 wherein said DC bias voltage changes the DC voltage level at the output terminal of said deflection amplifier so as to cutoff said error amplifier.

11. A deflection amplifier according to claim 10 including a deflection rate ramp signal generator and means for generating a deflection rate sampling signal representative of said deflection current, said ramp and sampling signals being applied as inputs to said error amplifier to form an AC negative feedback loop that develops said deflection rate drive signal.

* * * * *